June 17, 1941.    R. R. SEARLES    2,246,471
BEARING SEAL
Filed Dec. 7, 1938
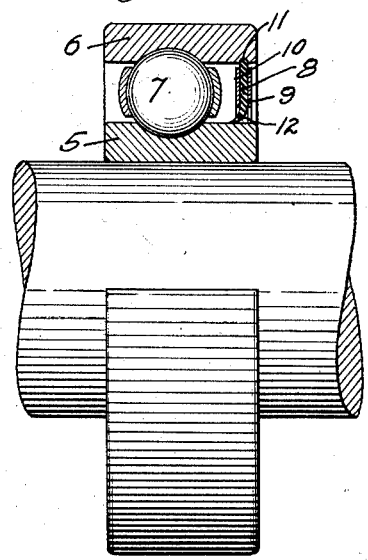
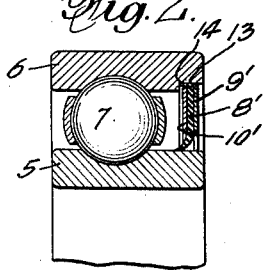
INVENTOR
RAYMOND R. SEARLES
BY
ATTORNEYS.

Patented June 17, 1941

2,246,471

UNITED STATES PATENT OFFICE 2,246,471

BEARING SEAL

Raymond R. Searles, New Britain, Conn., assignor to The Fafnir Bearing Company, New Britain, Conn., a corporation of Connecticut Application December 7, 1938, Serial No. 244,341

2 Claims. (Cl. 286—5)

My invention relates to a bearing seal.

It is an object of the invention to provide an improved form of seal which is effective, relatively cheap to manufacture and easy to apply.

A further object is to provide an improved form of seal which is effective as a seal and which sets up but slight frictional losses during operation of the bearing.

In the drawing which shows, for illustrative purposes only, preferred forms of the invention—

Fig. 1 is an edge view in quarter section of a ball bearing embodying a seal illustrating the invention; and Fig. 2 is a fragmentary view similar to Fig. 1, illustrating a modified form of seal.

In said drawing the bearing includes an inner bearing ring 5 and an outer bearing ring 6 with interposed anti-friction bearing members, such as balls 7, running in raceway grooves in the two rings, as will be understood.

The seal shown in Fig. 1 comprises an annular flat disk member 8 of yielding material, preferably rubber which is not affected by oil. "Thiokol" is the trade name applied to one such material. The disk 8 is stiffened by external means and, in the form shown, I employ a pair of annular stiffening plates 9—10 at opposite sides of the disk. These plates may be formed of suitable material, preferably sheet metal, and are secured to and carried by the disk 8. The stiffening plates may be vulcanized or cemented directly to the disk or may be otherwise secured thereto, as by means of clips, rivets, etc. The outer bearing ring in the form shown has an annular internal groove 11 therein, and the outer edge of the disk 8 is forced into the outer ring and by its resiliency snaps into the groove 8, where it is quite securely held. The stiffening plates not only tend to stiffen the main body of the disk 8 but tend to restrict the action of the outer edge of the disk so that the entire disk is rendered less resilient to collapsing pressure and the outer edge, by the inherent resiliency of the disk, will serve to securely position the seal in the outer ring.

The disk 8 extends across the space between the two bearing rings and the inner portion of the ring is of progressively decreasing thickness, as indicated at 12. The inner edge may be brought down to a thin and therefore very resilient soft section and the inner edge is flexed transversely, in this case toward the anti-friction bearings and bears on the outer surface of the inner ring so as to form an effective seal against the loss of lubricant or the ingress of foreign matter. The very thin section at the inner edge of the disk 8 causes the same to bear quite lightly on the inner ring, so that slight frictional forces are set up during the operation of the bearing. The disks 8 are relatively cheap and the entire seal, while cheap to manufacture and possessing the advantages of a resilient seal, is sufficiently stiff for all practical purposes and is quite effective in use. The groove 11, because of the yielding or flowing character of the disk, is fully sealed.

In the form shown in Fig. 2 the disk 8' may be substantially the same as that heretofore described and operate in substantially the same manner. The stiffening plates 9'—10', instead of terminating short of the outer ring as they do in Fig. 1, may completely enclose the outer edge of the disk 8'. As shown, the stiffening plate 9' has an inwardly directed annular flange 13, and the outer edge of the disk 8' and the outer edge of the stiffening disk 10' are held within the annular cup flange 13. The flange 13 itself may be somewhat resilient and is forced into and frictionally held in the counterbore 14 of the outer ring. If desired the stiffening plates 9'—10' may be rigidly secured to the disk as heretofore described or the latter may simply be held between the two stiffening plates. In either event the bearing will be effectively sealed and a slight frictional force will be set up during operation of the bearing.

While the invention has been described in considerable detail and preferred forms illustrated, it is to be understood that various changes and modifications may be made within the scope of the invention as defined in the appended claims.

I claim:

1. Seal means comprising inner and outer concentric members, the inner surface of the outer member being provided with an annular groove, an annular disk of oil resistant rubber, and annular stiffening plates secured to opposite sides of said annular disk and extending nearly to the inner surface of the outer concentric member and terminating short of the outer and inner peripheries of the annular disk, to provide an outer, narrow annular peripheral portion of limited resiliency for snapping into the retaining groove in the outer concentric member, and to provide an inner annular resilient portion bearing against the outer surface of the inner concentric member.

2. Seal means comprising inner and outer concentric members, the inner surface of the outer member being provided with an annular groove, an annular disk of oil resistant rubber, and at least one annular stiffening plate secured over the major portion of its area to one side of said annular disk and extending nearly to the inner surface of the outer concentric member and terminating short of the outer and inner peripheries of the annular disk, to provide an outer, narrow annular peripheral portion of limited resiliency for snapping into the retaining groove in the outer concentric member, and to provide an inner annular resilient portion bearing against the outer surface of the inner concentric member.

RAYMOND R. SEARLES.